United States Patent [19]
Diehl et al.

[11] Patent Number: 5,802,111
[45] Date of Patent: Sep. 1, 1998

[54] COMPLEX CONSTELLATION POINT MULTIPLIER

[75] Inventors: John W. Diehl, Elmhurst; Henry L. Kazecki, Arlington Heights, both of Ill.

[73] Assignee: Motorola, Inc., Schaumburg, Ill.

[21] Appl. No.: 804,866

[22] Filed: Feb. 24, 1997

(Under 37 CFR 1.47)

[51] Int. Cl.[6] .............................. H04K 27/00; G06F 7/52
[52] U.S. Cl. ...................... 375/259; 364/754.03; 455/550
[58] Field of Search ............................... 375/259, 261, 375/280, 295, 298, 308, 331, 332, 340; 455/403, 550; 364/754.03; 327/356

[56] References Cited

U.S. PATENT DOCUMENTS

| | | | |
|---|---|---|---|
| 3,926,367 | 12/1975 | Bond et al. | 364/827 |
| 4,896,287 | 1/1990 | O'Donnell et al. | 364/754.03 |
| 5,365,549 | 11/1994 | Kazecki | 375/343 |

*Primary Examiner*—Stephen Chin
*Assistant Examiner*—Jeffrey W. Gluck
*Attorney, Agent, or Firm*—Sylvia Y. Chen

[57] ABSTRACT

A complex constellation point multiplier (600) multiplies a complex number by a point in a digital modulation constellation. The desired constellation point is mapped to a digital control word. The complex number is connected to multiplicand input nodes (610, 615) and the digital control word is connected to control input nodes (620, 623, 626). Via logic gates (602, 603, 605, 606, 607, 609), the control word controls switches (651–658) and simple arithmetic blocks, such as accumulators (650, 659), scaler blocks (663, 665), and negation blocks (643, 646), to generate an output complex number that is the product of the input complex number and the constellation point. This complex constellation point multiplier provides a lower size and lower power-consumption alternative to traditional complex number multipliers.

18 Claims, 7 Drawing Sheets

FIG. 2 —PRIOR ART—

| CONTROL WORD $q_2 q_1 q_0$ | OUTPUT |
|---|---|
| 000 | $c + jd$ |
| 001 | $\frac{\sqrt{2}}{2}(c-d) + j\frac{\sqrt{2}}{2}(c+d)$ |
| 010 | $-d + jc$ |
| 011 | $\frac{\sqrt{2}}{2}(-c-d) + j\frac{\sqrt{2}}{2}(c-d)$ |
| 100 | $-c - jd$ |
| 101 | $\frac{\sqrt{2}}{2}(d-c) + j\frac{\sqrt{2}}{2}(-c-d)$ |
| 110 | $d - jc$ |
| 111 | $\frac{\sqrt{2}}{2}(d+c) + j\frac{\sqrt{2}}{2}(d-c)$ |

*FIG. 4*

| FUNCTION | REAL BRANCH | IMAGINARY BRANCH |
|---|---|---|
| $c + d$ | $q_1 q_0$ | $\overline{q_1} q_0$ |
| $c - d$ | $\overline{q_1} q_0$ | $q_1 q_0$ |
| $\frac{\sqrt{2}}{2}$ SCALING | $q_0$ | $q_0$ |
| NEGATION | $q_2 \oplus q_1$ | $q_2$ |

FIG. 5

COMPLEX CONSTELLATION POINT MULTIPLIER

FIELD OF THE INVENTION

This invention relates generally to communication systems, and more particularly to a low power-consumption constellation multiplier for use in a digital communication system.

BACKGROUND OF THE INVENTION

Digital communication systems, such as π/4 differential quadrature phase shift keying (π/4 DQPSK) and other variations of quadratureamplitude modulation (QAM) such as 64-QAM, 16-QAM, and QPSK, require that points in a symbol constellation be multiplied by complex numbers. For example, pulse shaping filters used to limit the bandwidth of the transmitted signal, complex correlation used for synchronization, and adaptive channel estimation used for channel sounding, all require multiplication of a constellation point with a complex number in either a transmitter or a receiver of the digital communication system.

Generally, complex multiplication uses signal processing algorithms that are implemented using an on-board single-cycle multiplier-and-accumulator (MAC) of a general-purpose digital signal processor. A MAC, however, has a significant size and current drain. If signal processing is performed using a dedicated application-specific integrated circuit (ASIC), a single-cycle MAC is both costly and wasteful in terms of size and power consumption.

Thus, there is a need for a multiplier, which can be implemented in a digital communication system transmitter or receiver, that allows complex multiplication yet also has low power consumption and low cost.

BRIEF DESCRIPTION OF THE DRAWINGS

FIG. 4 shows a table that maps control words, which represent the constellation points shown in FIG. 3, to the output of the multiplier shown in FIG. 1.

FIG. 5 shows a table of Boolean expressions for controlling the four basic operations according to a preferred embodiment.

DETAILED DESCRIPTION OF THE PREFERRED EMBODIMENTS

A complex constellation point multiplier multiplies a complex number by a point in a digital modulation symbol constellation. The desired constellation point is assigned a digital control word. The complex number is connected to multiplicand input nodes and the digital control word is connected to control input nodes. Via logic gates, the control word controls switches and simple arithmetic blocks, such as accumulators, scaler blocks, and negation blocks, to generate an output complex number that is the product of the input complex number and the constellation point. By judiciously arranging switches, accumulators, scaler blocks, and negation blocks, the cost, size, and current drain of the complex constellation point multiplier is reduced compared to conventional multiplier-and-accumulators.

Figure 1:
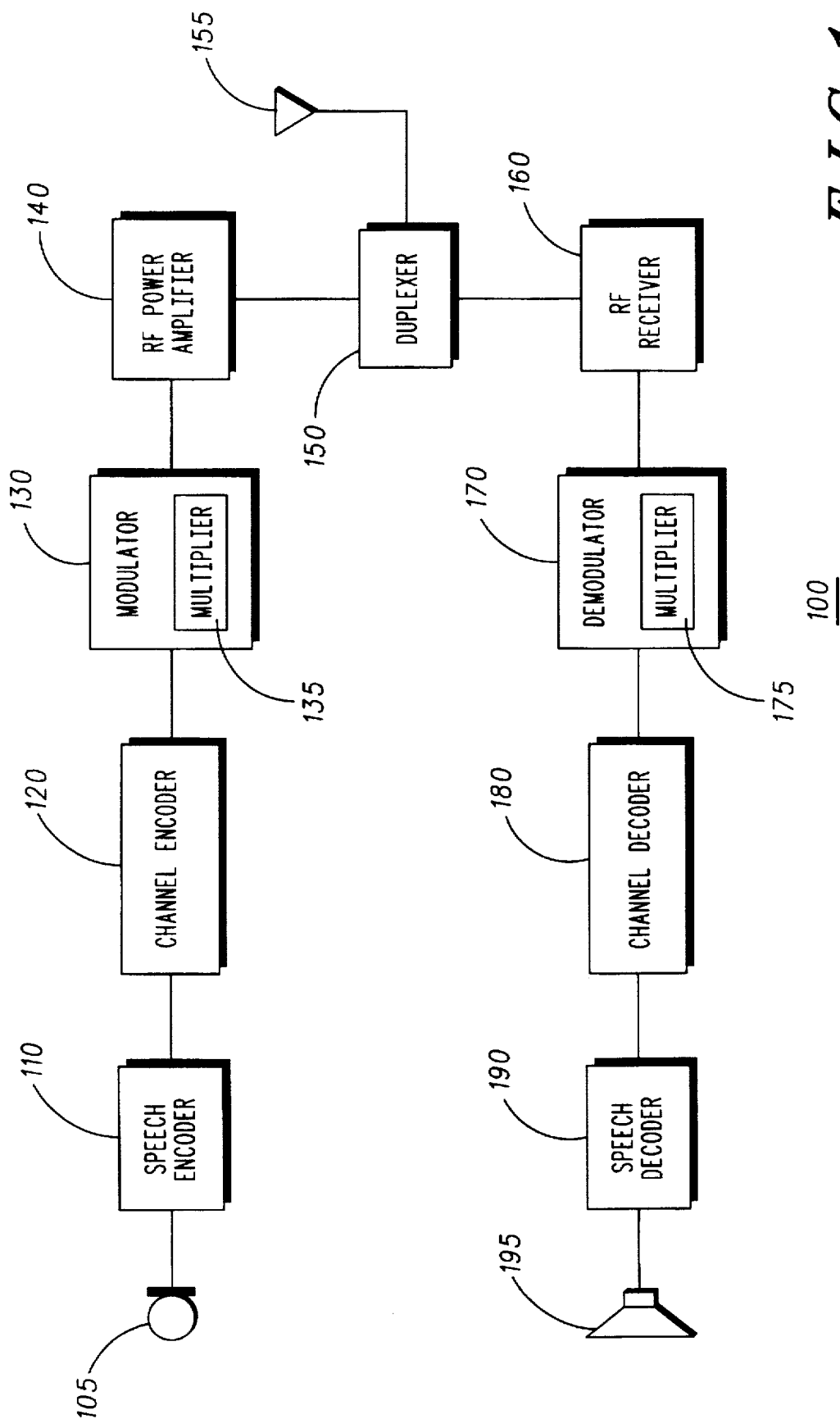
FIG. 1 shows a block system diagram of a communication system including a multiplier.

FIG. 1 shows a block system diagram of a communication system including a multiplier. The communication system 100 shown is a radio-telephone, however, other communication devices, such as a two-way radio, a modulator-demodulator (MODEM), a pager, or the like, may use a similar communication system including a multiplier.

In the transmitter section, an analog 17.input signal from a microphone 105 is processed through a speech encoder 110 and a digital channel encoder 120. A digital bit stream from channel encoder 120 enters modulator 130 which includes a multiplier 135 that converts incoming symbol sequences into digital pulses. These pulses are then shaped and modulated onto a radio frequency (RF) carrier. A linear RF power amplifier 140 amplifies the modulated signal, and duplexer 150 and antenna 155 enable transmission of the modulated signal across a wireless communication channel.

In the receiver portion of the communication system, antenna 155 receives a modulated signal from a complementary communication device, and duplexer 150 directs the signal to RF receiver 160, demodulator 170 with multiplier 175, channel decoder 180, and speech decoder 190. Audio speaker 195 then plays the baseband signal from speech decoder 190.

In this communication system 100, a multiplier 135 is desired in the modulator 130 so that pulse shaping filters in the modulator can properly limit the bandwidth of the transmitted signal. A multiplier 175 can also be used for complex correlation and adaptive channel estimation in the demodulator 170. A single multiplier can be used in both the transmitter and receiver sections of the communication system, if desired.

Figure 2:
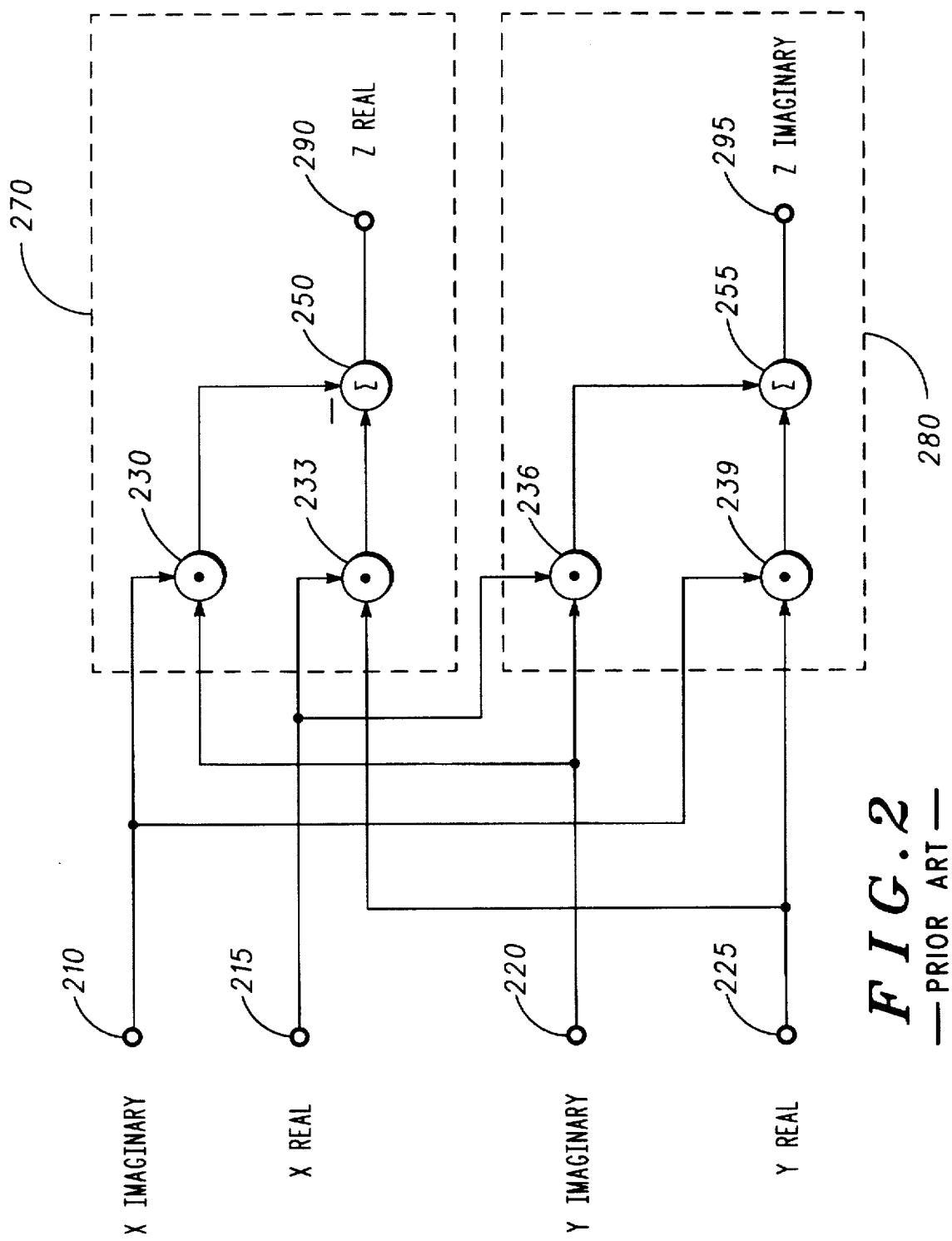
FIG. 2 shows a block diagram of a prior art complex number multiplier.

FIG. 2 shows a block diagram of a prior art complex number multiplier. This prior art multiplier 200 can multiply any two complex numbers, and it can be used as a multiplier 135, 175 in communication system 100 shown in FIG. 1. The prior art multiplier 200 has four input nodes 210, 215, 220, 225, four MAC blocks 230, 233, 236, 239, and two accumulator blocks 250, 255. The real component of a first complex number X is connected to node 215 and the imaginary component of complex number X is connected to node 210. Meanwhile, the real component of a second complex number Y is connected to node 225 while the imaginary component of complex number Y is connected to node 220. The complex number Z, which is the product of complex numbers X and Y will be provided at output nodes 290, 295 with the real component of complex number Z at output node 290 and the imaginary component of complex number Z at output node 295.

In the real branch 270 of the prior art multiplier, MAC block 230 multiplies the imaginary components of complex numbers X and Y together, MAC block 233 multiplies the real components of complex numbers X and Y together, and accumulator block 250 subtracts the product of MAC block 230 from the product of MAC block 233 to produce the real component of complex number Z at output node 290.

In the imaginary branch 280 of the prior art multiplier, another MAC block 236 multiplies the real component of complex number X by the imaginary component of complex number Y. MAC block 239 multiplies the real component of complex number Y by the imaginary component of complex number X. Finally, accumulator block 255 sums the products from MAC blocks 236, 239 to generate the imaginary component of the product, complex number Z, at output node 295.

Implementing this circuit so that one output complex number Z with eight-bit real and imaginary components is produced every clock cycle requires over 3000 gates. If the high gate-count MAC blocks 230, 233, 236, 239 could be replaced with a different configuration, the gate count and the current drain of the prior art complex number multiplier could be decreased significantly.

Figure 3:
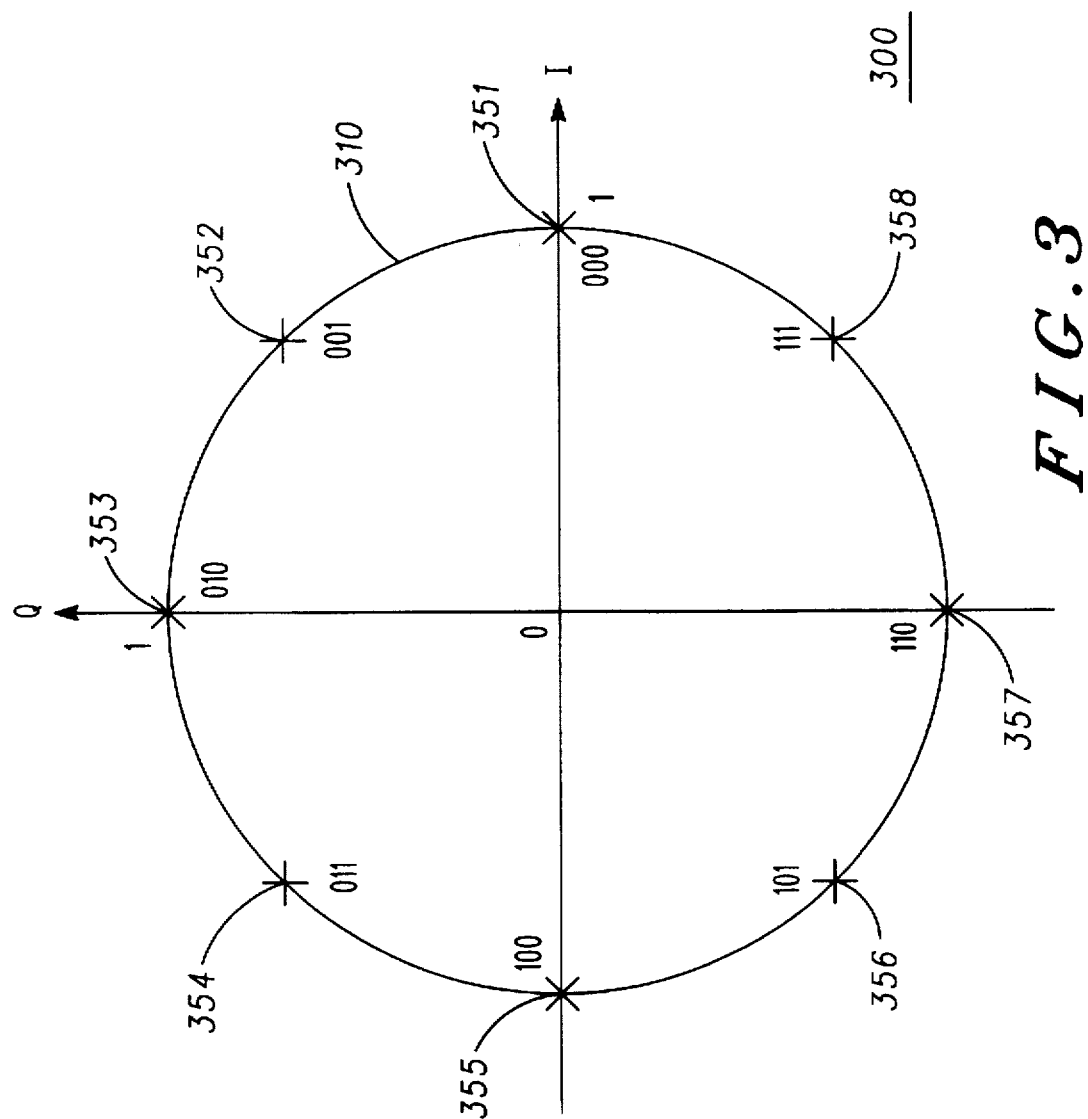
FIG. 3 shows a sample symbol constellation that can be used by the communication system shown in FIG. 1

FIG. 3 shows a sample symbol constellation that can be used by the communication system shown in FIG. 1. For example, a π/4 DQPSK digital signal constellation 300 has eight constellation points 351–358, where each constellation point falls on the unit circle 310 at angles that are multiples of forty-five degrees. Each constellation point can be assigned a three-bit binary control word from 000 to 111 as shown. Then, the prior art complex number multiplier shown in FIG. 2 could then be simplified because the second complex number Y is limited to a known finite set.

FIG. 4 shows a table that maps control words, which represent the constellation points shown in FIG. 3, to the output of the multiplier shown in FIG. 1. For any input complex number, X=c+jd, c represents the real component of the complex number X and d represents the imaginary component of the complex number. When the constellation point having control word $a_2a_1a_0$=000 shown in FIG. 3 is multiplied by a complex number X, the resulting complex number Z is simply Z=c+jd. When a different constellation point, such as the constellation point having control word $a_2a_1a_0$=111, is multiplied by complex number X, the resulting complex number Z is Z=($\sqrt{2}$/2)(c+d)+j($\sqrt{2}$/2)(d−c). Other constellation point multiplier outputs are as shown in the table.

From the table, it can be seen that there are four basic operations that need to be performed in either the real or imaginary branch of the multiplier: (c+d), (c−d), $\sqrt{2}$/2 scaling, and negation. If the three-bit representation of each constellation point is used as a control word $a_2a_1a_0$, the Boolean expression for the real and imaginary branches of the multiplier can be represented as shown in FIG. 5.

FIG. 5 shows a table of Boolean expressions for controlling the four basic operations according to a preferred embodiment. The function (c+d) is needed in the real branch of a multiplier when control word $a_1a_0$=1. The function (c+d) is needed in the imaginary branch of a multiplier when control bit $a_0\bar{a}_1$=1. The second line of the table shows that the function (c−d) is needed in the real branch when $\bar{a}_1a_0$=1 and is needed in the imaginary branch when $a_1a_0$=1. The third line shows that a $\sqrt{2}$/2 scaling function is needed in both the real and imaginary branches of a multiplier when $a_0$=1. Finally the fourth line shows that a negation function is needed in the real branch when $a_2\oplus a_1$=1 and needed in the imaginary branch when $a_2$=1.

By determining which basic arithmetic functions are needed in order to carry out the multiplication of a complex number with each constellation point of a digital modulation scheme and assigning appropriate control words to a finite set of constellation points, the prior art complex number multiplier shown in FIG. 2 can be replaced with a simpler and more efficient complex constellation point multiplier.

Figure 6:
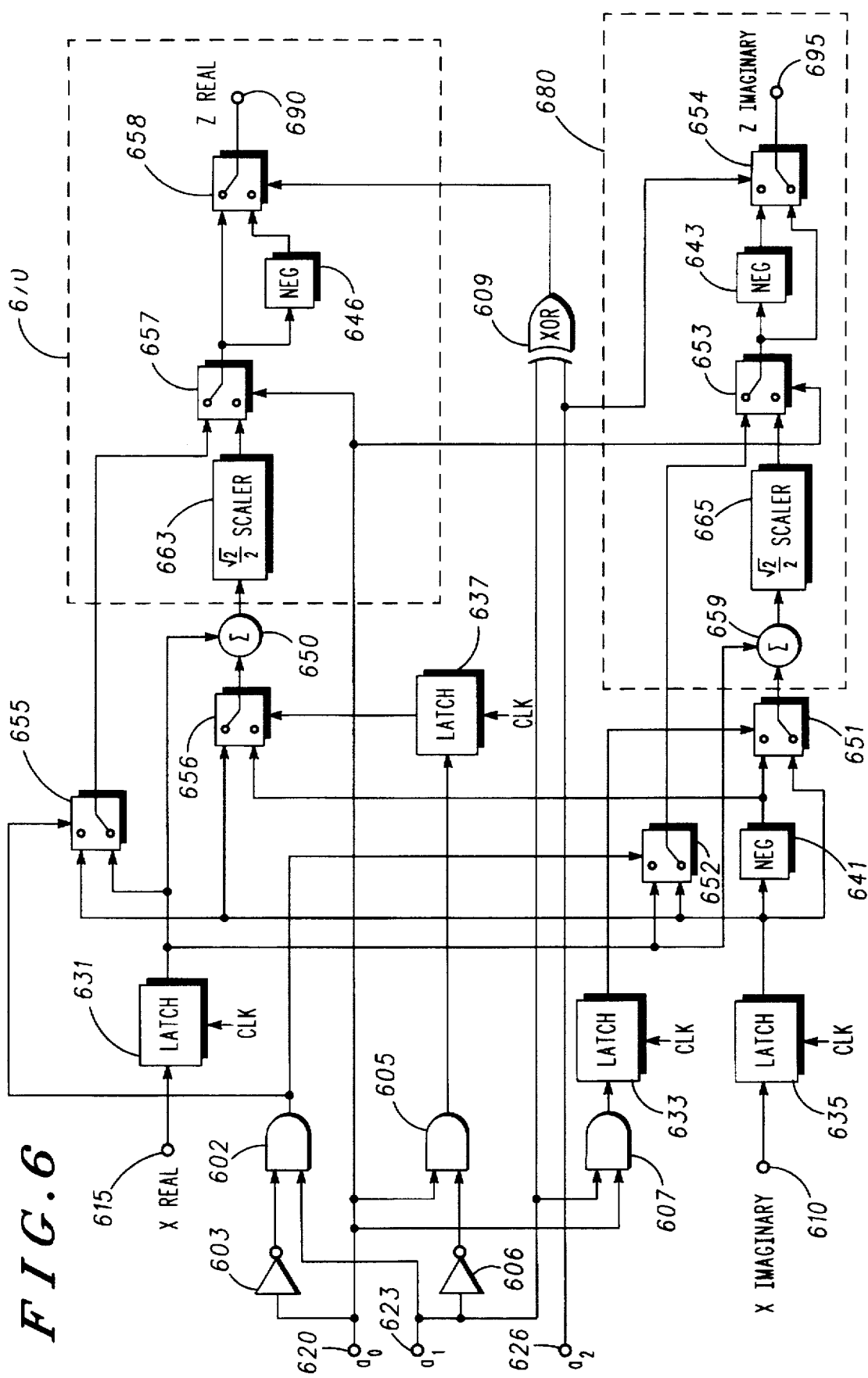
FIG. 6 shows a block diagram of a complex constellation point multiplier according to a preferred embodiment.

FIG. 6 shows a block diagram of a complex constellation point multiplier according to a preferred embodiment. The complex constellation point multiplier 600 is used as a multiplier 135, 175 in the communication system 100 of FIG. 1. The complex constellation point multiplier 600 shown is optimized for a π/4 DQPSK modulation scheme, however, the complex constellation point multiplier may be implemented for any QAM communications scheme. The real component of a complex number X is connected to multiplicand input node 615 while the imaginary component of complex number X is connected to multiplicand input node 610. A three-bit control word $a_2a_1a_0$ corresponding to one of the constellation points shown in FIG. 3 to be multiplied with complex number X is connected to control input nodes 620, 623, 626. In this example, the complex constellation point multiplier is shown with control word $a_2a_1a_0$=000 active. AND logic gates 602, 605, 607, NOT logic gates 603, 606, and exclusive OR (XOR) logic gate 609 use the control word $a_2a_1a_0$ to direct the performance of the four basic functions shown in FIG. 5 as required using switches 651–658. Latches 631, 633, 635, 637 reduce the current drain of the complex constellation point multiplier by holding an input word when conditions are static and by enabling synchronous operation. The latches, however, are not necessary for the operation of the circuit and may be eliminated.

Switches 652, 655 select between the real and imaginary components of complex number X. In the real branch 670 of the complex constellation point multiplier, accumulator 650 adds the real component of complex number X to either the imaginary component of complex number X or its negation from switch 656. The sum from accumulator 650 is scaled using $\sqrt{2}$/2 scaler block 663. Switch 657 is used to select either the scaled sum from scaler block 663 or a component of complex number Z from switch 655. Then switch 658 selects either the output directly from switch 657 or its negated version from negation block 646 for connection to output node 690 to produce the real component of complex number Z.

In the imaginary branch 680, accumulator 659 adds the real component of complex number X to either the imaginary component of complex number X, or its negation through negation block 641, as selected by switch 651. The sum is scaled using $\sqrt{2}$/2 scaler block 665. Switch 653 selects either the output of scaler block 665 or a component of complex number Z from switch 652. Finally, switch 654 selects either the output of switch 653 or the negation of that output through negation block 643. The output of switch 654 is connected to output node 695 and represents the imaginary component of complex number Z, which depicts a selected constellation point having control word $a_2a_1a_0$ multiplied by any complex number X.

The complex constellation point multiplier 600 may be modified for use with digital signal modulation schemes besides π/4 DQPSK, such as 64-QAM, 16-QAM, or QPSK. To accommodate phases aside from the forty-five degree phases of π/4 DQPSK, the control words or multiplier outputs of the table shown in FIG. 4 should be modified. The basic functions, shown in FIG. 5 may also need to be modified with a corresponding change in the control logic configuration of the complex constellation point multiplier. To accommodate amplitudes aside from one, the $\sqrt{2}$/2 scaler blocks 663, 665 should be modified or gain stages could be added at the outputs of switches 654, 658.

Figure 7:
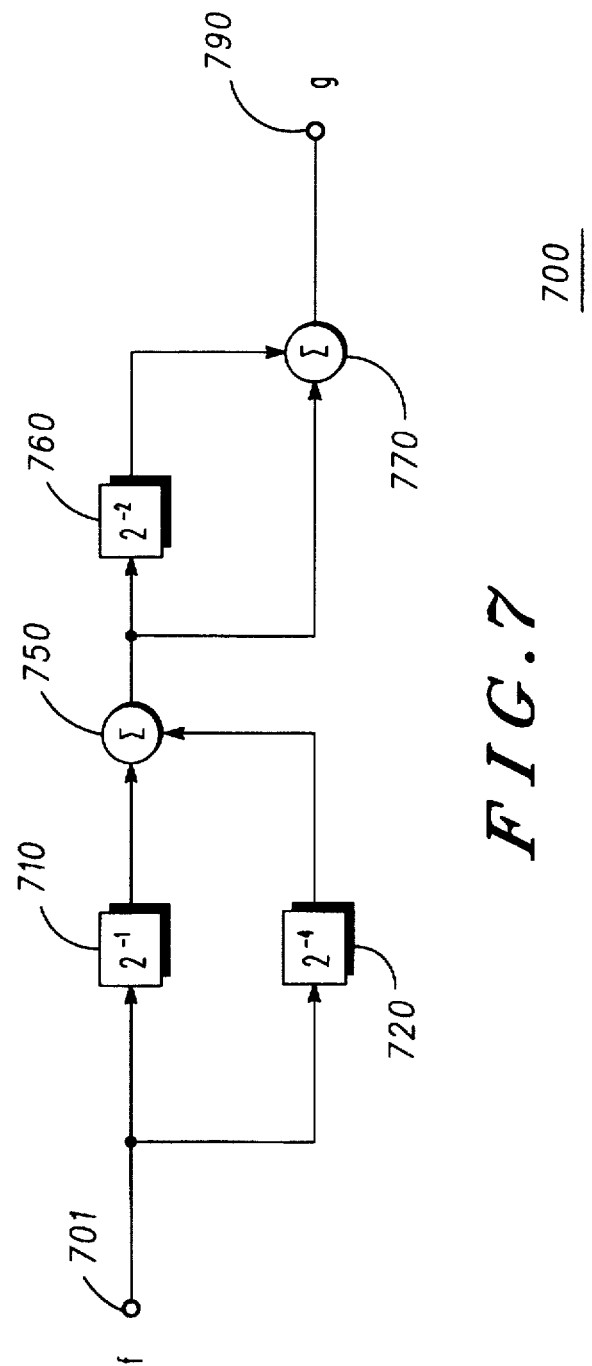
FIG. 7 shows a block diagram of the √2/2 scaler blocks shown in FIG. 6 according to a preferred embodiment.

FIG. 7 shows a block diagram detailing the $\sqrt{2}$/2 scaler blocks 663, 665 shown in FIG. 6, according to a preferred embodiment. In this embodiment, the irrational number $\sqrt{2}$/2 is approximated as 0.703125. A digital word is connected to input node 701. Shift register 710 shifts each bit of the input word to the right by one bit and puts a zero into the most significant place, which operatively halves the value of the digital word. Meanwhile shift register 720 shifts each bit of the input word to the right by four bits and places zeros in the most significant four bits, which creates an output value approximately equal to one-sixteenth of the input value. The outputs of shift registers 710, 720 are summed together in accumulator 750. The output of the accumulator is connected to shift register 760, which shifts each bit of each incoming word to the right by two bits and places zeros in the most significant two bits, which creates a word value that is approximately one-fourth of the incoming word value. The output of shift register 760 is added to the output of accumulator 750 using accumulator 770. This creates an output word at output node 790 which is 0.703125 times the digital word value at node 701. Of course more precise approximations of $\sqrt{2}/2$ scaling may be implemented using different shift register and accumulator configurations.

An advantage to the complex constellation point multiplier is that it maps a limited number of constellation points to digital control words and uses those digital words to control switches and simple arithmetic functions, such as shifts and adds. This eliminates the need for costly MAC blocks such as those found in the prior art complex number multiplier shown in FIG. 2. Thus, the hardware size and current drain of the complex constellation point multiplier is much lower than that of the prior art complex number multiplier shown in FIG. 2. The performance of the complex constellation point multiplier, however, is equivalent to that of the prior art complex number multiplier shown in FIG. 2.

Thus, the complex constellation point multiplier provides a low-cost alternative to traditional multipliers. While specific components and functions of the complex constellation point multiplier are described above, fewer or additional functions could be employed by one skilled in the art within the true spirit and scope of the present invention. The invention should be limited only by the appended claims.

We claim:

1. A method for multiplying a complex number by a point from a set containing a finite number of points comprising the steps of:

converting the point into a digital control word; and using the digital control word to direct arithmetic functions on the complex number.

2. A method according to claim 1 wherein the arithmetic functions consist of accumulating, scaling, and negation.

3. A method according to claim 1 wherein the arithmetic functions comprise accumulating, scaling, and negation.

4. A multiplier comprising:

a control input node, for receiving a digital control word representing a point from a set containing it finite number of points;

a multiplicand input node, for receiving a complex number from a set containing an infinite number of complex numbers; and a real branch, coupled to the control input node and the multiplicand input node, for generating a real component of a complex number representing a product of the point and the complex number.

5. A multiplier according to claim 4 further comprising:

a latch coupled between the multiplicand input node and the real branch.

6. A multiplier according to claim 4 wherein the real branch comprises:

an accumulator coupled to the multiplicand input node.

7. A multiplier according to claim 6 wherein the real branch further comprises:

a scaler block coupled to an output of the accumulator.

8. A multiplier according to claim 4 wherein the real branch comprises:

a scaler block coupled to the multiplicand input node.

9. A multiplier according to claim 4 wherein the real branch comprises:

a negation block coupled to the multiplicand input node.

10. A multiplier according to claim 4 further comprising:

an imaginary branch, coupled to the control input node and the multiplicand input node, for generating an imaginary component of the complex number representing the product of the point and the complex number.

11. A multiplier according to claim 10 further comprising:

a latch coupled between the multiplicand input node and the imaginary branch.

12. A multiplier according to claim 10 wherein the imaginary branch comprises:

an accumulator coupled to the multiplicand input node.

13. A multiplier according to claim 12 wherein the imaginary branch further comprises:

a scaler block coupled to an output of the accumulator.

14. A multiplier according to claim 10 wherein the imaginary branch comprises:

a scaler block coupled to the multiplicand input node.

15. A multiplier according to claim 10 wherein the imaginary branch comprises:

a negation block coupled to the multiplicand input node.

16. A radiotelephone comprising:

a constellation multiplier including:

a control input node, for receiving a digital control word representing a point from a set containing a finite number of points;

a multiplicand input node, for receiving a complex number from a set containing an infinite number of complex numbers;

a real branch, coupled to the control input node and the multiplicand input node, for generating a real component of a complex number representing a product of the point and the complex number, having:

a first accumulator coupled to the multiplicand input node;

a first scaler block coupled to the multiplicand input node; and a first negation block coupled to the multiplicand input node;

an imaginary branch, coupled to the control input node and the multiplicand input node, for generating an imaginary component of a complex number representing the product of the point and the complex number, having:

a second accumulator coupled to the multiplicand input node;

a second scaler block coupled to the multiplicand input node; and a second negation block coupled to the multiplicand input node.

17. A radiotelephone according to claim 16 further comprising:

a latch coupled between the multiplicand input node and the real branch.

18. A radiotelephone according to claim 16 further comprising:

a latch coupled between the multiplicand input node and the imaginary branch.

\* \* \* \* \*

UNITED STATES PATENT AND TRADEMARK OFFICE
CERTIFICATE OF CORRECTION

PATENT NO. : 5,802,111
DATED : September 1, 1998
INVENTOR(S) : Diehl et al.

It is certified that error appears in the above-indentified patent and that said Letters Patent is hereby corrected as shown below:

<u>Claim 4</u>

In column 5, line 46, please replace "it" with --a--.

Signed and Sealed this

Fifteenth Day of December, 1998

*Attest:*

BRUCE LEHMAN

*Attesting Officer*      *Commissioner of Patents and Trademarks*